(12) United States Patent
Chaussat et al.

(10) Patent No.: US 10,132,359 B2
(45) Date of Patent: Nov. 20, 2018

(54) BEARING UNIT INCLUDING AN IMPULSE RING AND APPARATUS COMPRISING AT LEAST ONE SUCH BEARING UNIT

(71) Applicant: Aktiebolaget SKF, Gothenburg (SE)

(72) Inventors: Sylvain Chaussat, Mont-pres-Chambord (FR); Vincent Sausset, Azay-le-Rideau (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/805,623

(22) Filed: Nov. 7, 2017

(65) Prior Publication Data

US 2018/0128320 A1    May 10, 2018

(30) Foreign Application Priority Data

Nov. 8, 2016   (DE) .................. 10 2016 221 903

(51) Int. Cl.
   *F16C 41/00*    (2006.01)
   *F16C 19/06*    (2006.01)
   *G01D 5/12*     (2006.01)
(52) U.S. Cl.
   CPC ............ *F16C 41/007* (2013.01); *F16C 19/06* (2013.01); *G01D 5/12* (2013.01)

(58) Field of Classification Search
   CPC ............................ F16C 41/007; G01P 3/443
   See application file for complete search history.

(56) References Cited

U.S. PATENT DOCUMENTS 7,270,483 B2 *  9/2007  Ishiguro ............... F16C 33/586
                                                         384/448
9,494,196 B2 * 11/2016  Sausset ................ F16C 41/007

FOREIGN PATENT DOCUMENTS

DE       102011084260 B4 * 10/2014  ............ F16C 41/007

* cited by examiner

*Primary Examiner* — Thomas R Hannon
(74) *Attorney, Agent, or Firm* — Bryan Peckjian; SKF USA Inc. Patent Dept.

(57) ABSTRACT

A bearing unit having a bearing centered on a central axis and including a rotating inner ring, a non-rotating outer ring, and at least one row of rolling elements arranged between the rings. The bearing unit further includes an impulse ring including a target holder that radially extends from the rotating inner ring and radially beyond the outer ring, a target that is fixed to an outer periphery of the target holder beyond the outer ring and that is adapted to cooperate with a detection device for tracking the rotation of the impulse ring around the central axis, and a fixing sleeve.

7 Claims, 2 Drawing Sheets

BEARING UNIT INCLUDING AN IMPULSE RING AND APPARATUS COMPRISING AT LEAST ONE SUCH BEARING UNIT

CROSS-REFERENCE

This application claims priority to German patent application no. 102016221903.0 filed on Nov. 8, 2016, the contents of which are fully incorporated herein by reference.

TECHNOLOGICAL FIELD

The invention relates to a bearing unit, comprising a bearing and an impulse ring. The invention also concerns an apparatus comprising at least one such bearing unit.

BACKGROUND

Today, bearing units are commonly used in automotive, aeronautics and other technical fields. These units provide high quality signals and transmissions, while allow integration in simpler and more compact apparatus.

Such a bearing unit generally comprises a bearing, and an impulse ring. Detection means are arranged in respect with the bearing unit so as to face the impulse ring. The impulse ring may comprise a target holder and a target. The target is preferably a magnetized portion including alternating north and south poles, whose number depends on bearing size, accuracy and particular application. With a bearing having suitable dimensions, impulse ring may be fixed to a rotating ring of this bearing, while detection means may be fixed to a non-rotating ring of this bearing or a stationary support or housing.

With a bearing having small dimensions, it may be necessary to position the detection means beside the bearing, while impulse ring is fixed to inner ring and extends radially beyond outer ring of the bearing. Together, bearing and impulse ring forms a bearing unit which can be fixed to a rotating shaft. However, when shaft, inner ring and impulse ring are rotating at high speed, target holder may be deformed.

It is known from FR-A-2 884 367 to provide a target holder with an inner tubular portion fixed to the rotating inner ring, an outer tubular portion that holds the target radially beyond the non-rotating outer ring, and a radial portion extending between the inner and outer portions. The radial portion has a specific shape and reinforcement ribs to avoid interference with the outer ring and to prevent deformation of the radial portion. However, the inner tubular portion and the radial portion form a right angle which can be damaged at high rotation speeds and vibrations. More precisely, the radial portion oscillates in respect with the inner tubular portion. The deformation between the tubular inner portion and the radial portion can be permanent. It can further induces material fatigue and then increases the risks of breaking. The target may be in an undesired position, temporarily or permanently, leading to a decrease of the measurement accuracy of the detection means.

SUMMARY

The aim of the invention is to provide a bearing unit including an impulse ring which has a target holder which better undergoes high rotation speeds and vibrations, which ensures a high measurement accuracy, which is easy to manufacture and not expensive.

To this end, the invention relates to a bearing unit comprising a bearing and an impulse ring. The bearing is centered on a central axis includes a rotating inner ring, a non-rotating outer ring, and at least one row of rolling elements arranged between the rings. The impulse ring includes a target holder that radially extends from the rotating inner ring and radially beyond the outer ring, and a target that is fixed to an outer periphery of the target holder beyond the outer ring and that is adapted to cooperate with detection means for tracking the rotation of the impulse ring around the central axis.

According to the invention, the impulse ring further comprises a fixing sleeve including an axial portion that is fixed in a bore of the rotating inner ring, and a radial collar that radially outwardly extends from the axial portion. An inner periphery of the target holder is clamped between the inner ring and the radial collar of fixing sleeve so as to prevent any relative rotation between the fixing sleeve, target holder and inner ring.

Thanks to the invention, the fixing function of the impulse ring to the rotating inner ring is done by an additional part separated from the target holder. The inner periphery of the target holder only radially extends and is pressed by the radial collar of the fixing sleeve onto a front surface of the rotating inner ring. The inner periphery of the target holder is maintained in position at high rotation speeds and vibrations and is prevented from any oscillating movement in respect with the rotating inner ring. The impulse ring is more robust at high rotation speeds and vibrations.

The oscillations of the target holder are highly reduced and the movements of the target held by the target holder are limited. The measurement accuracy of the target rotation by the detection means is increased.

Another advantage of the present invention is that the impulse ring can be partly standardized. A standardized fixing sleeve can be used while the target holder is adapted to the application dimensions. Alternatively, a standardized target holder can be used while the fixing sleeve is adapted to a bearing with specific dimensions. The impulse ring according to the invention is manufacturing and cost effective.

According to further aspects of the invention which are advantageous but not compulsory, such a mechanical system may incorporate one or several of the following features:

The rolling elements are balls.

The rolling elements are circumferentially equally held by a cage.

At least one axial side of the bearing comprises sealing means located between the inner ring and the outer ring.

The target is a magnetized portion including alternate magnetic poles.

The fixing sleeve is made from a stamped metal sheet.

The target holder is made from a stamped metal sheet.

The fixing sleeve and the target holder are made of the same material.

The fixing sleeve and the target holder are made of different materials.

The materials of fixing sleeve and the material of target holder have a same coefficient of thermal expansion.

The target holder comprises stiffening ribs.

The target holder comprises shifting means so as to axially shift the inner and outer peripheries and prevent any interference with the outer ring.

The shifting means comprise at least one frustoconical portion that is inclined with respect to the central axis towards the opposite direction to the bearing.

The target is fixed to an outer tubular portion that axially extends from the outer periphery of the target holder.

The inner periphery of the target holder is an annular edge.

The inner periphery of the target holder comprises a plurality of teeth.

The axial portion of fixing sleeve is tubular.

The tubular axial portion of fixing sleeve is annular.

The radial collar of fixing sleeve is annular.

Surface structures are provided to a radial contact surface of one of the radial collar of the fixing sleeve or the target holder, the surface structures increasing the surface roughness.

Surface structures may consist in slots, grooves, granular portions or any other suitable structures.

Surface structures may be formed by stamping, caulking, surface treatment laser or any other suitable process.

A final object of the invention is an apparatus having a rotating shaft, detection means and at least one bearing unit as mentioned here-above. The inner ring of the bearing is fixed on the rotating shaft and the detection means are associated with the impulse ring for tracking the rotation of the rotating shaft.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
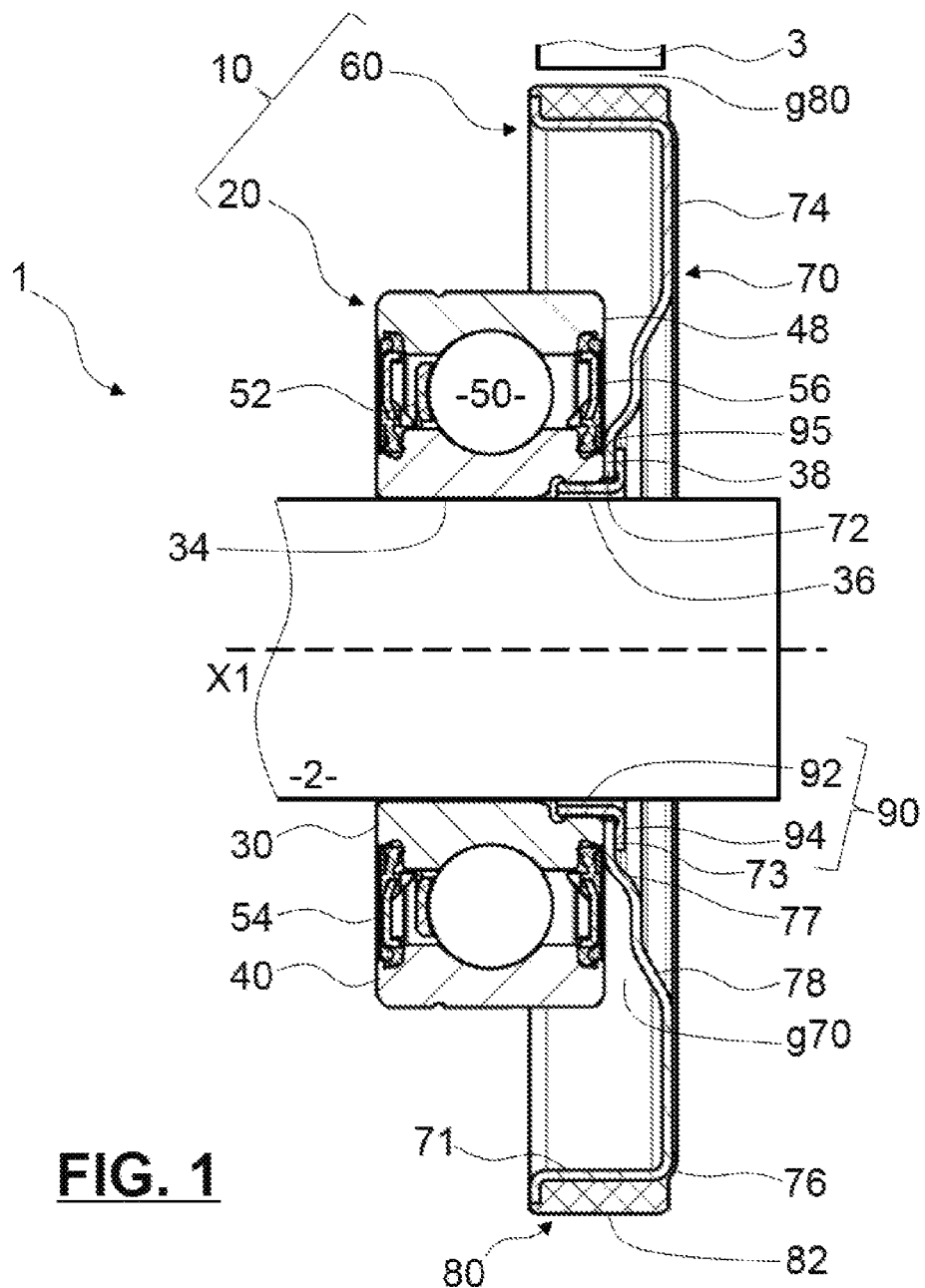
FIG. 1 is an axial sectional view of a bearing unit according to the invention.
Figure 2:
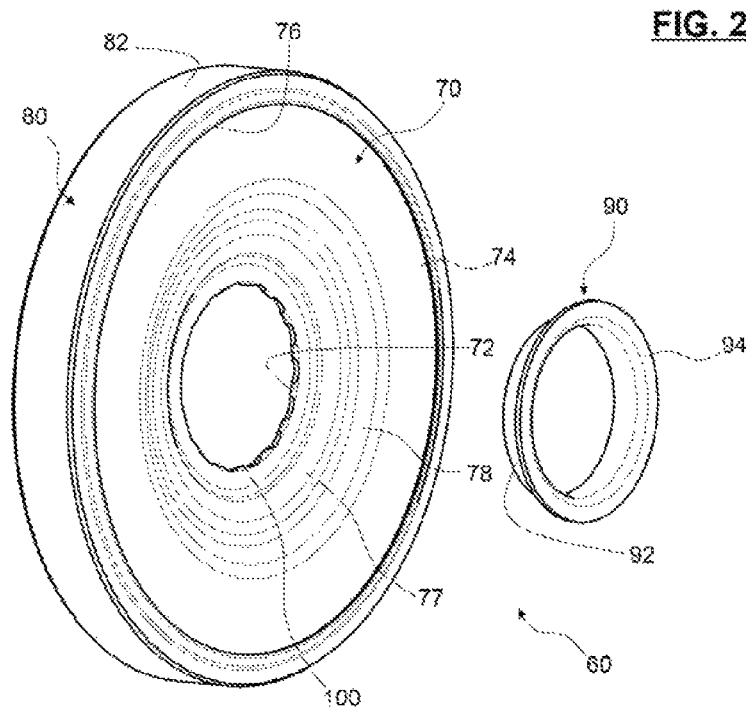
FIG. 2 is an exploded view of an impulse ring according to the invention.

The bearing unit 10 according to the invention represented on FIG. 1 is adapted to equip an apparatus 1, such a motor, a brake system, a suspension system or any rotating machine, in particular for an automotive vehicle.

Apparatus 1 is shown partially on FIG. 1. Apparatus 1 comprises a rotating shaft 2, a bearing unit 10 and detection means 3. Shaft 2 and bearing unit 10 are centered on a central axis X1 of apparatus 1. Bearing unit 10 comprises a bearing 20 mounted on shaft 2, and a magnetic impulse ring 60 mounted on the bearing 20. Detection means 3 are associated with the impulse ring 60 for tracking the rotation of the rotating shaft 2.

The bearing 20 includes a rotating inner ring 30 and a non-rotating outer ring 40 centered on axis X1. Bearing 20 also comprises rolling elements 50, here balls, located between inner ring 30 and outer ring 40 and held in a cage 52. The inner ring 30 comprises a first cylindrical bore 34 and a second cylindrical bore 36. With reference to axis X1, diameter of bore 34 is smaller than diameter of bore 36. On the side of bearing 20 where impulse ring 60 is located, closer to bore 36 than to bore 34, rings 30 and 40 have annular lateral faces, respectively 38 and 48. Inner ring 30 is fixed on rotating shaft 2, which is fitted into bore 34. Outer ring 40 can be mounted in a fixed support member or housing not shown, belonging to apparatus 1.

Preferably, each axial side of bearing 20 comprises sealing means, respectively 54 and 56, located between inner ring 30 and outer ring 40. For example, sealing means 54 and 56 are rubber seals comprising a base fixed on outer ring, a sealing lip in sliding contact with the inner ring, and a rigid insert located between base and lip. As another alternative, only one side of bearing 20 may comprise sealing means 54 or 56. As another alternative, sealing means 54 and/or 56 may have any suitable configuration.

The impulse ring 60 includes a target holder 70, a target 80 and a fixing sleeve 90.

The target holder 70 may be made of metal or plastic, formed by stamping or by any other suitable process. Going away from central axis X1, target holder 70 comprises an inner periphery 72, a radial portion 74 and an outer periphery 76. The inner periphery 72 defines an inner bore the target holder 70, and is fixed to the rotating inner ring 30 of bearing 20 by means of the fixing sleeve 90. The radial portion 74 substantially radially extends from the inner periphery 72 towards the exterior of the bearing 20. The outer periphery 76 of the radial portion 74 is located radially beyond the outer ring 40.

The radial portion 74 comprises frustoconical portions 77, 78 that are inclined in respect with central axis X1 towards the opposite direction to the bearing 20. A gap g70 is provided axially between the radial portion 74 of target holder 70 and the lateral face 48 of outer ring 40. Portions 77, 78 prevent any interference between the target holder 70 and the outer ring 40. As another alternative, the target holder 70 may comprise shifting means of any alternate suitable shape. As another alternative, the target holder 70 may comprise one or more than two shifting means.

The outer periphery 76 of the target holder 70 comprises an outer tubular portion 71 that axially extends from the radial portion 74. The outer tubular portion 71 extends parallel to axis X1 and is located radially above the outer ring 40 of bearing 20.

Target 80 is held by the outer tubular portion 71 of target holder 70, beyond outer ring 40 radially to axis X1. Target 80 is a plastic molded part including magnetic poles, with an outer surface 82 that radially faces detection means 3. Target 80 and detection means 3 cooperate for tracking the rotation of the impulse ring 60, target holder 70, inner ring 30 and shaft 2 around central axis X1. A gap g80 is provided radially between surface 82 and detection means 3. In other words, target 80 of impulse ring 60 is a radial target.

As an alternative, impulse ring may have an axial target, with a gap defined axially between target and detection means. In this case, the outer periphery 76 of target holder 70 is specifically adapted.

As another alternative, detection means 3 and impulse ring 60 may use any other suitable technology instead of magnetic technology. For example, induction technology or optic technology may be implemented within bearing unit 10 of apparatus 1.

The inner periphery 72 of target holder 70 is fixed to the rotating inner ring 30 of bearing 20 by means of the fixing sleeve 90. Fixing sleeve 90 may be made of metal or plastic, formed by stamping or by any other suitable process. Materials of fixing sleeve 90 and target holder 70 have preferably the same coefficient of thermal expansion. Materials of fixing sleeve 90 and target holder 70 can be the same or different.

Fixing sleeve 90 comprises an annular tubular portion 92 that axially extends parallel to axis X1. Tubular portion 92 is fitted in the bore 36 of the rotating inner ring 30.

Fixing sleeve 90 further comprises a radial collar 94 that radially outwardly extends from an end of the annular tubular portion 92. Radial collar 94 is overlapping the inner periphery 72 of radial extension of the target holder 70. The inner periphery 72 is axially pressed by the radial collar 94 onto the lateral face 38 of inner ring 30 so as to prevent any relative rotation between the fixing sleeve 90, target holder 70 and inner ring 30.

Advantageously, the bore defined by the inner periphery 72 of target holder 70 is provided with a plurality of teeth 100. When the tubular portion 72 of fixing sleeve 90 is axially fitted in the bore 36 of inner ring 30, the radial collar 94 is axially pressed against the teeth 100 of inner periphery 72. The teeth 100 induce local deformations of the radial collar 94 and form anti-rotation means. As another alternate, the inner periphery 72 of target holder 70 comprises an annular edge.

Advantageously, at least one of the contact surfaces, 95 and 73 respectively, of one of the radial collar 94 of fixing sleeve 90 or the target holder 70 is provided with surface structures increasing the surface roughness. Any relative rotation between the fixing sleeve 90 and the target holder 70 is prevented. Surface structures may consist in slots, grooves, granular portions or any other suitable structures. Surface structures may be formed by stamping, caulking, surface treatment laser or any other suitable process.

Although the present invention has been illustrated using single-row ball bearings, it will be understood that the invention can be applied without major modification to bearings using rolling elements that are not balls such rollers or needles, and/or that have several rows of rolling elements.

The technical characteristics of the embodiments and alternate variations considered above may be combined.

What is claimed is:

1. A bearing unit comprising:
    a bearing centered on a central axis and including a rotating inner ring, a non-rotating outer ring, and at least one row of rolling elements arranged between the rings, and
    an impulse ring including a target holder that radially extends from the rotating inner ring and radially beyond the outer ring, and a target fixed to an outer periphery of the target holder beyond the outer ring and that is adapted to cooperate with detection means for tracking the rotation of the impulse ring around the central axis (X1), wherein
    the impulse ring further includes a fixing sleeve having an axial portion fixed in a bore of the rotating inner ring, and a radial collar that radially outwardly extends from the axial portion, an inner periphery of the target holder clamped between the inner ring and the radial collar of fixing sleeve to prevent any relative rotation between the fixing sleeve, target holder and inner ring.

2. The bearing unit according to claim 1, wherein the materials used to manufacture the fixing sleeve and the target holder have a same coefficient of thermal expansion.

3. The bearing unit according to claim 1, wherein the target holder comprises shifting means to axially shift the inner periphery and outer periphery and prevent any interference with the outer ring.

4. The bearing unit according to claim 1, wherein the shifting means comprises at least one frustoconical portion that is inclined with respect to the central axis towards the opposite direction to the bearing.

5. The bearing unit according to claim 1, wherein the target is fixed to an outer tubular portion that axially extends from the outer periphery of the target holder.

6. The bearing unit according to claim 1, wherein surface structures are provided to a radial contact surface of one of the radial collar of fixing sleeve or the target holder, the surface structures increasing the surface roughness.

7. An apparatus comprising:
    a rotating shaft,
    detection means, and
    at least one bearing unit a bearing centered on a central axis and including a rotating inner ring, a non-rotating outer ring, and at least one row of rolling elements arranged between the rings,
    an impulse ring including a target holder that radially extends from the rotating inner ring and radially beyond the outer ring, and a target fixed to an outer periphery of the target holder beyond the outer ring and that is adapted to cooperate with detection means for tracking the rotation of the impulse ring around the central axis, wherein
    the impulse ring further includes a fixing sleeve having an axial portion fixed in a bore of the rotating inner ring, and a radial collar that radially outwardly extends from the axial portion, an inner periphery of the target holder clamped between the inner ring and the radial collar of fixing sleeve to prevent any relative rotation between the fixing sleeve, target holder and inner ring and wherein
    the inner ring of bearing is fixed on the rotating shaft and the detection means is associated with the impulse ring for tracking the rotation of the rotating shaft.

* * * * *